United States Patent Office 3,661,899
Patented May 9, 1972

---

3,661,899
2(5H)-FURANONE COMPOUNDS
John A. Ford, Jr., and Charles V. Wilson, Rochester, N.Y., assignors to Eastman Kodak Company, Rochester, N.Y.
No Drawing. Continuation-in-part of application Ser. No. 870,437, Nov. 12, 1969, which is a division of application Ser. No. 555,240, June 6, 1966. This application June 1, 1970, Ser. No. 42,535
Int. Cl. C09b 23/00; C07d 5/10
U.S. Cl. 260—240
12 Claims

ABSTRACT OF THE DISCLOSURE

Certain 2(5H)-furanone compounds are described and claimed. These compounds, depending on their particular structure, are textile dyes, sensitizers for organic photoconductors in electrophotography, ultraviolet absorbers, for example, for linear condensation polymers or useful for the heat stabilization of polyesters, such as poly(ethylene terephthalate). Some of the compounds have more than one of the utilities just mentioned. 3-cyano-5-orthonitrobenzylidene - 4 - phenyl - 2(5H) - furanone and 3 - cyano-5-dimethylaminomethylidene-4-phenyl-2-(5H)-furanone are illustrative of 2(5H)-furanone compounds.

---

This application is a continuation-in-part of our copending application Ser. No. 870,437 (now abandoned), filed Nov. 12, 1969, which is a division of our application Ser. No. 555,240, filed June 6, 1966 now U.S. Patent 3,507,38 granted Apr. 21, 1970.

The present invention is directed to novel 2(5H)-furnone compounds. The compounds of our invention, depending on their particular structure, are textile dyes, sensitizers for organic photoconductors in electrophotography, ultraviolet absorbers, for example, for linear condensation polymers or useful for the heat stabilization of polyesters, such as poly(ethylene terephthalate). Some of the compounds have more than one of the utilities just mentioned.

It is recognized that dyes which are useful for dyeing synthetic fibers and which absorb unexpectedly long wave lengths of light are of value. Also it is recognized that dyes which act as sensitizing dyes for organic photoconductors in electrophotography are of value. Also, compounds useful for the heat stabilization of polyesters are of value.

Therefore, it is an object of our invention to provide dyes for synthetic fibers which absorb unexpectedly long wave lengths of light. Another object of our invention is to provide dyes useful for sensitizing organic photoconductors in electrophotography. A further object of our invention is to provide a series of dyes having the ability to dye textiles a wide range of colors over substantially the entire range of the spectrum. Another object of our invention is to provide compounds which are useful as ultraviolet absorbers. Another object of our invention is to provide compounds useful for the heat stabilization of polyesters. Other objects of our invention will appear herein.

The 2(5H)-furanone compounds of our invention have the formula:

(I)

$$O=C \overset{O}{\underset{A-C=C-B}{\diagdown}} C=D-W-Q$$

wherein A is $$-CN, \quad p-NO_2-\langle\phantom{x}\rangle-, \quad p-CN-\langle\phantom{x}\rangle- \text{ or } -\overset{O}{\underset{\|}{C}}-R$$

wherein R is amino, a substituted amino group, alkoxy of 1 to 8 carbon atoms, aralkoxy in which the alkyl portion has been than 6 carbon atoms, a low carbon alkyl group, a phenyl nucleus, a naphthyl nucleus or a heterocyclic nucleus, B is a hydrogen atom, a low carbon alkyl group, a phenyl nucleus, a naphthyl nucleus, an aralkyl group or an alkaryl group, D is a methylidene radical, $$=C\overset{CH_3}{\diagdown}, \quad =CH-CH=CH-$$

a nitrogen atom, a hydrazinylidene radical, a phenylenemethylidene radical or a di(low carbon alkyl)aminophenylmethylidene radical or an alkylenemethylidene radical having the formula $$-(CH_2)_y-\overset{R^1}{\underset{|}{C}}=$$

wherein $R^1$ is hydrogen or methyl and y is 2 to 4, W is a carbon-carbon single bond or a methylidene radical and Q is an aryl radical, a heterocyclic radical, a heterocyclylidene radical (or a di(low carbon alkyl)amino group.

It will be understood that in the above formula, amino is $-NH_2$; substituted amino can be represented for example by anilino, a di(low carbon alkyl)amino group, such as dimethylamino, diethylamino, dipropylamino, dibutylamino and the like a mono(low carbon alkyl)amino group, such as methylamino, ethylamino, propylamino, butylamino and the like;

$$-NH\overset{O}{\underset{\|}{C}}NHC_6H_5 \quad (\text{phenylureido})$$

NH(ethoxycarbonyl), i.e.

$$-NH\overset{O}{\underset{\|}{C}}-O-C_2H_5$$

and the like; alkoxy can be a radical containing 1 to 8 carbon atoms in the alkyl portion, such as methoxy, ethoxy, propoxy and the like; aralkoxy represents a moiety in which the alkyl portion has less than 6 carbon atoms, for example, benzyloxy, phenethoxy and the like; low carbon alkyl is an alkyl group such as methyl, ethyl, propyl, isopropyl and butyl, for example; aryl is a moiety having 6 to 10 nuclear carbon atoms such as exemplified by phenyl, naphthyl, aminophenyl, nitrophenyl, chlorophenyl and the like; heterocyclic is exemplified by thiazolyl, imidazolyl, furyl, pyrrolyl, quinolyl, 1,3,3-trimethylindolene-2-yl, julolidyl, benzothiazolyl and the like; aralkyl is exemplified by benzyl, phenethyl, naphthylmethyl and the like; alkaryl is represented by tolyl (ortho, meta or para)xylyl, methylnaphthyl and the like; alkylidene is exemplified by methylidene (=CH—), methylmethylidene $$(=\overset{CH_3}{\underset{|}{C}}-)$$

and the like; aralkylidene is exemplified by phenylenemethylidene $$(=CH-\langle\phantom{x}\rangle-)$$

and the like; and "a nitrogen atom" means (=N—).

Compounds of Formula 1 which absorb light having wavelengths at or above 410 nm. and wherein A is $$-CN, \quad p-NO_2-\langle\phantom{x}\rangle-, \quad p-CN-\langle\phantom{x}\rangle- \text{ or } -\overset{O}{\underset{\|}{C}}-R$$

R being an amino, substituted amino, alkoxy, aralkoxy, alkyl, aryl or heterocyclic substituent; B is an aryl, alkyl, aralkyl, alkaryl or H substituent; D is a methylidene radical,

a phenylenemethylidene radical, a nitrogen atom, a hydrazinylylidene radical, an alkylidene radical or an aralkylidene radical; W is either a bond or a methylidene radical and Q is aryl, a heterocyclic ring or a heterocyclylidene radical have been found to be effective as textile dyes or as sensitizers for organic photoconductors in electrophotography. In many cases they are useful for both purposes just named.

The dyes of our invention are prepared by reacting a 2(5H)-furanone with a dye forming compound characterized in that it will react with an active methylene group to produce a conjugated system of atoms attached to and including the residual carbon from the methylene group. Some compounds useful in forming dyes in accordance with our invention are aldehydes, diazonium compounds, ortho esters, p-nitrosoanilines, ketones, pseudothioketones, intermediate oxidation states of p-phenylenediamine, anilinovinyl derivatives of active methyl compounds and the like.

The 2(5H)-furanones may be conveniently prepared by reacting a halocarbonyl compound such as alpha-haloacetophenone with an alkali metal salt of cyanoacetic acid, described in detail in our application Ser. No. 555,239, filed June 6, 1966, now U.S. Patent 3,468,912 issued Sept. 23, 1969, whereby a 3-cyano-2(5H)-furanone is obtained. If some other furanone such as a 3-nitro-2(5H)-furanone or 3-nitrophenyl-2(5H)-furanone is desired, the salt of nitroacetic acid or of nitrophenyl acetic acid may be employed as the reagent to react with the halocarbonyl compound in making the corresponding furanone.

As an example of the wide variety of dye colors obtainable in the dyes in accordance with the invention, the following illustrates the colors which are obtained by reacting 3 - cyano-4-(p-bromophenyl)-2(5H)-furanone (I) with various compounds.

(A) I+benzene diazonium chloride→orange dye
(B) I+benzaldehyde→yellow dye
(C) I+dimethyl nitrosoaniline→magenta dye
(D) I+triethyl orthoformate and tertiary amine (pyridine)→blue dye
(E) I+1,3,3-trimethoxy propene→cyan dye
(F) I+dialkylaminebenzene diazonium Cl→blue dye
(G) I+p-dimethylamino benzaldehyde→red dye.

In some cases it is desirable to use instead of the furanones referred to as the intermediate in making the dye, a compound having the formula:

(2)

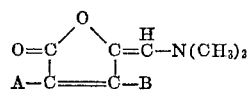

wherein A and B are as defined in connection with structural Formula 1. These intermediates may be readily prepared by reacting a 2(5H)-furanone with phosphoryl chloride and dimethyl formamide. The following example illustrates the preparation of 3-cyano-5-dimethylaminomethylidene-4-phenyl 2(5H)-furanone:

30.6 g. (0.2 mole) of phosphoryl chloride was added to 200 ml. of dimethyl formamide with stirring while cooled with an ice bath. 37 g. (0.2 mole) of 3-cyano-4-phenyl-2(5H)-furanone was added to the solution thus obtained and the temperature rose to 46° C. in 15 minutes. The mass was stirred for 1 hour during which time a green solid separated. The mass was heated at 70–80° C. for an additional hour, cooled to room temperature and was then treated with 300 ml. of 10% aqueous NaOH. The solid product was collected on a filter, washed with water and dried, being a pale green solid melting at 219–222° C.

The following examples illustrate the preparation of dyes in accordance with the invention.

EXAMPLE I 37 grams (0.2 mole) of 3-cyano-4-phenyl 2(5H)-furanone and 30 grams (0.2 mole) of N,N-dimethyl-p-nitrosoaniline were dissolved in 400 ml. of dioxane. This solution was refluxed for 1 hour and was then allowed to cool overnight at room temperature. The solid which formed was filtered off and was recrystallized from 400 ml. of dioxane to give 32.7 grams (51.6 percent) of shiny green needles of 3-cyano-5-p-dimethylaminophenylimino-4-phenyl-2(5H)-furanone melting at 247–248° C. This material was found to be useful as a sensitizing dye for organic photoconductors in electrophotography.

EXAMPLE II 55.6 grams (0.2 mole) of p-N-ethyl-N-2-hydroxyethyl-aminoaniline sulfate was dissolved in 400 ml. of distilled water containing 68 ml. (0.8 mole) of concentrated hydrochloric acid. There was then added dropwise to this solution with mechanical stirring at 0–5°, a solution of 13.8 grams (0.2 mole) of sodium nitrite in 50 ml. of distilled water. The mass was stirred for 15 minutes after completion of the addition and then was added dropwise at 0–10° to a solution of 37 grams (0.2 mole) of 3-cyano-4-phenyl-2(5H)-furanone, 1 liter of tetrahydrofuran and 78.6 grams (1.3 mole) of aqueous 28% ammonia. After the addition had been completed, the mixture was stirred overnight and was then diluted with 1 liter of water. The solid which separated was filtered off and dried to give 31.6 grams of 4-cyano-3-phenyl-2,5-dihydrofuran-2,5-dione-2-p-N-ethyl - N-2 - hydroxyethylaminophenylhydrazone, which melted at 183–184°. Repeated recrystallization from tetrahydrofuran-acetonitrile gave 13.3 grams (17.7 percent) of greenish-brown crystals melting at 195–196° C. The dye compound obtained dyes modified acrylonitrile materials blue.

EXAMPLE III

Dissolved in 300 ml. of toluene were the following: 25 grams (0.168 mole) of p-dimethylaminobenzaldehyde, 31.0 grams (0.168 mole) of 3-cyano-4-phenyl-2(5H)-furanone, 0.5 ml. of piperidine and 0.5 ml. of glacial acetic acid. This solution was refluxed for 10 minutes during which time 2.8 ml. of water was removed azeotropically. The mixture was cooled and the product was filtered, washed with benzene and dried giving 47.8 grams of shiny blue-gray crystals of 5-p-dimethylaminobenzal-3-cyano-4-phenyl-2(5H)-furanone. One recrystallization with filtration with 300 ml. of chlorobenzene gave 41.9 grams of the product melting at 235–237.5°. This material acted as a sensitizing dye for photoconductors in electrophotography.

EXAMPLE IV 37 grams (0.2 mole) of 3-cyano-4-phenyl-2(5H)-furanone was mixed with 14.8 grams (0.1 mole) of triethyl orthoformate and 250 ml. of pyridine. The resulting mass was refluxed with stirring for 1 hour, cooled in ice and the solid obtained was filtered off, washed with pyridine and then with ether and was dried at 60° C. to give 19.3 grams of green crystals of 5-[3-cyano-2-hydroxy-4-phenyl-5-furylmethylidene]-3-cyano - 4 - phenyl-2(5H)-furanone, pyridine salt. Recrystallization from pyridine gave 15.1 grams of shiny green crystals of 5-[3-cyano-2-hydroxy - 4 - phenyl - 5 - furylmethylidene]-3-cyano-4-phenyl-2(5H)-furanone, pyridine salt melting at 276–277° C. The dye compound obtained dyes modified acrylonitrile materials blue.

EXAMPLE V 12 grams (0.05 mole) of 3-cyano-5-dimethylaminomethylidene-4-phenyl-2(5H)-furanone and 9.3 grams (0.05 mole) of 3-cyano-4-phenyl-2(5H)-furanone were dissolved in 250 ml. of pyridine and the solution was stirred and refluxed for 2 hours. The mixture was then cooled in ice and the solid which formed was filtered off and dried to give 13.8 grams of a solid material melting at 267° C. (dec.). The product was recrystallized from 100 ml. of pyridine giving 9.8 grams of green crystals of bis[3-cyano-4-phenyl-2(5H)-furanone-(5)]-monomethineoxonol dimethylamine salt. This material acted as a sensitizing dye for organic photoconductors.

EXAMPLE VI

A mixture of 8.1 grams (0.025 mole) of 3,4-bis-p-nitrophenyl-2(5H)-furanone, 6 grams (0.025 mole) of 3-cyano-5-dimethylaminomethylidene-4-phenyl - 2(5H)-furanone, 50 ml. of pyridine, and 3 ml. of triethylamine was refluxed for 1 hour with mechanical stirring. The mass was held overnight at room temperature. The solid which formed was filtered off giving 5.2 grams (33 percent) of dark green crystals melting at 275–276° C. The product obtained was [3-cyano-4-phenyl-2(5H)-furanone-(5)] - [3,4-di-p-nitrophenyl-2(5H)-furanone-(5)]-monomethineoxonol, triethylamine salt.

EXAMPLE VII 12 grams (0.05 mole) of 3-cyano-5-dimethylaminomethylidene-4-phenyl-2(5H)-furanone, 16.3 grams (0.05 mole) of cyclopentadienylidenetriphenylphosphorane and 1 ml. of glacial acetic acid was dissolved in 200 ml. of pyridine and the solution was refluxed with stirring for 1 hour. The mass was then diluted with 200 ml. of methanol and was cooled overnight by refrigeration. Filtration gave 19.7 grams of 2-[3-cyano-2,5-dihydro-2-oxo-4-phenyl - 5 - furylidenemethyl]cyclopentadienylidenetriphenylphosphorane melting at 240–241° C. The product was recrystallized from 100 ml. of chlorobenzene giving 18 grams of dark red crystals. This product acts as a sensitizing dye for organic photoconductors.

EXAMPLE VIII

A mixture was prepared of 10 grams (0.0416 mole) of 3 - cyano - 5 - dimethylaminomethylidene-4-phenyl 2(5H)-furanone, 12.7 grams (0.0416 mole) of 3-ethyl-2-methylbenzothiazolium iodide, 200 ml. of methanol, and 1 ml. of piperidine. The mixture was refluxed with stirring for 4 hours. It was then cooled to room temperature and the solid which formed was filtered off, washed with methanol and dried to give 12.1 grams of 3-cyano-5-[3-ethyl - 2 - benzothiazolylideneethylidene] - 4 - phenyl-2(5H)-furanone melting at 200–280° C. Recrystallization from 175 ml. of pyridine gave 8.9 grams (58 percent) of green crystals of a dye which acts as a sensitizer for organic photoconductors.

EXAMPLE IX 5,5'-terephthalylidenebis[3-carbamoyl-4-phenyl-2(5H)-furanone]

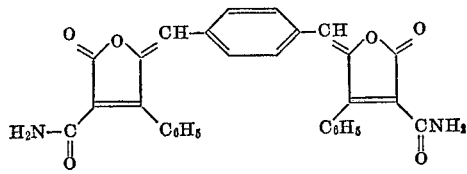

A mixture of 20.3 grams (0.100 mole) of 3-carbamoyl-4-phenyl-2(5H)-furanone (prepared as in Example XIII), 6.7 grams (0.050 mole) of terephthalaldehyde, 500 ml. of toluene, 1 ml. of piperidine and 1 ml. of glacial acetic acid (dried azeotropically with toluene) was refluxed with a Dean-Stark trap for ½ hour with stirring. During this time 1.8 ml. of water was removed and an orange solid separated. The mixture was cooled at room temperature and the solid filtered and dried to give 26.5 grams, M.P. about 350° C. (dec.). The dye compound obtained dyed Dacron polyester a yellow color.

$\lambda_{max.}^{DMF} = 327$ nm., 423 nm.; log $\epsilon = 4.15$, 4.63

EXAMPLE X 5,5'-terephthalylidenebis {3-[N-(2-ethylhexyloxycarbonyl)-carbamoyl]-4-phenyl-2(5H)-furanone}

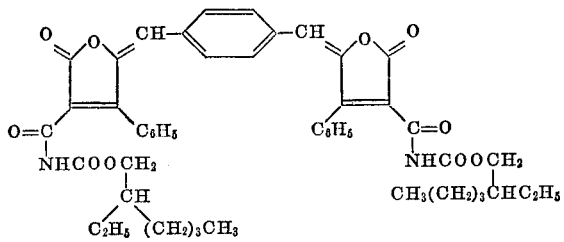

A mixture of 5.0 grams of 5,5'-terephthalylidenebis [3-cyano-4-phenyl-2(5H)-furanone] and 300 ml. of dry 1,2-dichloroethane was treated with 2.6 grams (0.020 mole) of oxalyl chloride. The orange suspension was refluxed with magnetic stirring for 6 hours. Ten milliliters of 2-ethylhexanol was added and refluxing was continued 1 hour longer. After standing overnight, 1 gram of orange solid was filtered from the reaction mixture. The filtrate was evaporated in a hood at room temperature to yield 5.6 grams orange solid residue. This orange colored solid material was recrystallized three times from glacial acetic acid to give 2.7 grams, M.P. 209–220° C. The dye compound obtained dyed Dacron polyester a lemon yellow color. It has a $\lambda_{max.}$ of 426 nm. in THF (tetrahydrofuran).

The effectiveness of the dyes of the invention as sensitizing addenda in organic photoconductor compositions was determined by comparing the relative speeds of unsensitized electrophotographic elements comprising known organic photoconductors with elements which were identical in all respects except that each of them contained a sensitizing amount of a representative dye in accordance with the invention. In every case the composition containing the sensitizing dye showed a substantial improvement in sensitivity.

The electrophotographic runs comparing these sensitizing dyes with products in which no sensitizing dye was present was carried out as follows:

A series of electrophotographic elements was prepared by coating on the surface of an aluminum foil (laminated to paper) at a wet thickness of 0.004 inch individual solutions prepared by dissolving in 5 ml. of tetrahydrofuran or dichloromethane 0.50 gram of polyester and a photoconductor selected from one of the following: (E) triphenylamine, (F) 1,3,5-triphenylpyrazoline, (G) 4,4'-bis(diethylamino) - 2,2'-dimethyltriphenylmethane, (H) 2,3,4,5 - tetraphenylpyrrole, and (K) 4,4'-bis(diethylamino)benzophenone. The resulting coatings were dried, dark conditioned for several hours and were charged in the dark by a positive corona to a surface potential of 600 volts. Relative speed values of the coatings were then determined and assigned on the basis of the reciprocal of the exposure required to reduce the initial surface potential by 100 volts as measured by an electrometer probe. The results obtained with each of the various organic photoconductors without sensitizing dye and with sensitizing dyes as indicated based on the following formula were as follows:

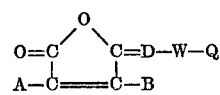

| Photo-conductor | Sensitizer | | | | | Relative speed |
|---|---|---|---|---|---|---|
| | A | B | D | W | Q | |
| E | | | | | | 20 |
| E | —CN | C₆H₅— | =N—NH— | | C₆H₅— | 30 |
| E | —CN | C₆H₅— | =CH—⟨C₆H₄⟩ | —CH= | 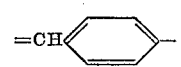 | 25 |
| E | —CN | C₆H₅— | =CH— | | 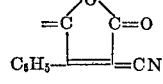 | 25 |
| E | —CN | C₆H₅— | =CH—CH=CH— | | C₆H₅ | 315 |
| F | | | | | | 62 |
| F | —CN | C₆H₅— | =C(CH₃)— | | C₆H₅— | 125 |
| F | p-NO₂—C₆H₄— | CH₃— | =CH— | | C₆H₅— | 100 |
| F | —CN | C₆H₅— | =CH—CH=CH— | | C₆H₅— | 200 |
| G | | | | | | 6 |
| G | —CN | C₆H₅— | =CH— | | C₆H₅— | 48 |
| G | —CN | C₆H₅— | =CH— | | 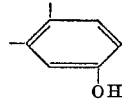 | 122 |
| G | —CN | C₆H₅ | =N—NH— | | C₆H₅— | 48 |
| G | —CN | C₆H₅— | =N— | | 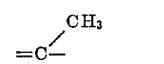 | 25 |
| G | —CN | C₆H₅— | =CH—CH=CH— | | 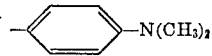 | 48 |
| G | —CN | C₆H₅ | =CH— | | 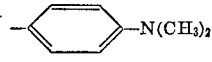 | 48 |
| G | —CN | C₆H₅— | =CH— | —CH= |  | 75 |
| G | —CN | C₆H₅— | =CH—CH=CH— | | 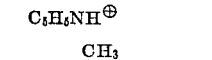 | 13 |
| G | —CN | C₆H₅— | =CH— | | 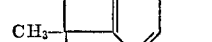 | 30 |
| G | p-NO₂—C₆H₄— | p-NO₂—C₆H₄— | =N— | |  | 40 |
| G | p-NO₂—C₆H₄— | p-NO₂—C₆H₄— | =CH— | |  | 200 |
| G | —CN | C₆H₅— | =CH—CH=CH— | | C₆H₅— | 200 |
| H | | | | | | 0 |
| H | —CN | C₆H₅ | =N—NH— | | C₆H₅— | 10 |
| H | —CN | C₆H₅ | =CH—CH=CH— | | C₆H₅— | 200 |
| K | | | | | | 40 |
| K | p-NO₂—C₆H₄— | p-NO₂—C₆H₄ | =N— | | 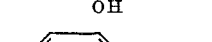 | 79 |
| K | —CN | C₆H₅— | =C(CH₃)— | | C₆H₅— | 63 |

In addition to their utility as sensitizing dyes for organic photoconductors, the dyes of our invention dye textiles brilliant shades of color ranging from yellow to blue. Representative examples of these dyes and the hues they produce on various fabrics are included in the following table wherein A, B, D, W and Q of Formula I have the meaning given in the table.

| Dye structure | | | | | Fabric | Hue |
|---|---|---|---|---|---|---|
| A | B | D | W | Q | | |
| —CN | C₆H₅— | =CH— | | C₆H₅—furanone with CN, O⁻, C₅H₅NH⁺ (pyridine) | Acrylic | Royal blue. |
| —CN | C₆H₅— | =CH— | —CH= | indoline with N-CH₃, C(CH₃)₂ | Polyester | Magenta. |
| —CN | C₆H₅— | =CH—CH=CH— | | C₆H₅—furanone with CN, O⁻, (C₂H₅)₃NH⁺ | Acrylic | Navy blue. |
| —CN | C₆H₅— | =C—C₆H₄—N(CH₃)₂ | | —C₆H₄—N(CH₃)₂ | Polyester | Red. |
| —CN | C₆H₅— | =CH—CH=CH— | | C₆H₅— | do | Yellow. |
| —CN | C₆H₅— | =C(CH₃)— | | C₆H₅— | do | Orange. |
| p-NO₂—C₆H₄— | p-NO₂—C₆H₄— | =CH— | | —C₆H₄—N(CH₃)₂ | do | Red. |
| —CN | C₆H₅— | =CH— | | julolidine | do | Red. |
| —C=O, NH—C(=O)—O—CH₂—CH(C₂H₅)—(CH₂)₃—CH₃ | C₆H₅— | =CH—C₆H₄— | | —CH=C(C₆H₅)—furanone—C=O—NH—C(=O)—O—CH₂—CH(C₆H₅)—(CH₂)₃—CH₃ | do | Yellow. |
| —CN | C₆H₅— | =CH— | | aryl-N(C₂H₅)(CH₂)₂N(CH₃)₂ with CH₃ | do | Red. |
| —CN | C₆H₅— | =CH— | —CH= | benzothiazoline with N-C₂H₅ | do | Red. |

EXAMPLE XI

The intermediate 3,4-diphenyl-2(5H)-furanone was made by reacting tolane with ethanol and carbon monoxide in the presence of palladium chloride and HCl by the method described in an article by Tsugi and Nogi, J.A.C.S. 88, 1289 (1961).

This intermediate was reacted with p-dimethylaminobenzaldehyde by the method described in Example III supra. There was obtained 5-p-dimethylaminobenzylidene-3,4-diphenyl-2(5H)-furanone, an orange dye melting at 246–249° C.

EXAMPLE XII 3-acetyl-5-dimethylaminobenzylidene-4-(4-hydroxy-3-methoxyphenyl)-2(5H)-furanone

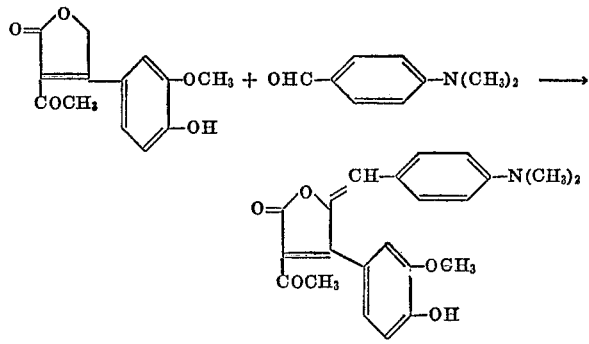

A solution of 10.0 grams (0.0404 mole) of α-acetyl-4-hydroxy-β-(hydroxymethyl) - 3 - methoxycinnamic acid γ-lactone, 6.0 grams (0.040 mole) of p-dimethylaminobenzaldehyde, 0.5 ml. of acetic acid, and 0.5 ml. of piperidine in 300 ml. of toluene was refluxed with stirring for 2 hours (about 0.5 ml. of water was collected in a Dean-Stark trap). A precipitate formed at the boiling point of the mixture. The reaction mixture was cooled overnight in a refrigerator. The solid was collected to yield 12.8 grams, M.P. 228–230° C. This product was recrystallized, with filtration, from 90 ml. of chlorobenzene to yield 10.4 grams (83.5 percent) of purple crystals, M.P. 227–229° C. The product obtained dyes polyester materials, such as Dacron polyester materials, orange shades $\lambda_{max.}^{DMF} = 504$ nm.

In general, the ultraviolet absorbing compounds of our invention possess the characteristics of solvent stability, and compatibility with other absorbing materials possessing similar characteristics, in order that they can be used alone or in combination therewith. In addition, the ultraviolet absorbing compounds employed in our invention are non-proteinaceous and possess little or no absorbing capability in the visible range of the electromagnetic spectrum. This means that the ultraviolet absorbers are most effective at wavelengths of about 410 nm. or less. That is, the ultraviolet absorbers are most effective in the ultraviolet portion of the electromagnetic spectrum and have little or no absorbing capability in the visible range of the electromagnetic spectrum. The ultraviolet absorbers of our invention are essentially non-color imparting.

The ultraviolet absorbing compounds of our invention are embraced by Formula 1. From what has been said in the preceding paragraph it is apparent that they do not include any of the textile dye compounds. The ultraviolet absorbing compounds of our invention, i.e. those compounds absorbing light at or below wavelengths of 410 nm. have the Formula 1 wherein A is

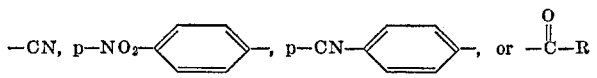

wherein R is amino, a substituted amino group, alkoxy of 1 to 8 carbon atoms, aralkoxy in which the alkyl portion has less than 6 carbon atoms, a low carbon alkyl group, a phenyl nucleus or a naphthyl nucleus, B is a hydrogen atom, a low carbon alkyl group, a phenyl nucleus, a naphthyl nucleus, an aralkyl group or an alkaryl group, D is a methylidene radical,

a p-phenylenemethylidene radical or a di(low carbon alkyl)aminophenylmethylidene radical, W is a carbon-carbon single bond or a methylidene radical and Q is an aryl radical or a di(low carbon alkyl)amino group.

The ultraviolet absorbing compounds of our invention and their preparation are described in the examples which follow.

EXAMPLE XIII 3-carbamoyl-4-phenyl-2(5H)-furanone

A solution of 40.0 grams (0.216 mole) of 3-cyano-4-phenyl-2(5H)-furanone and 400 ml. of 7:3 by volume sulfuric acid-water was stirred 8 hours on a steambath, allowed to cool overnight to room temperature, and poured onto 700 grams of crushed ice. The solid was collected, washed with water, and recrystallized twice from ethanol to give 21.5 grams (49.1 percent) of pale yellow needles, M.P. 168–170° C.

EXAMPLE XIV 5-benzylidene-3-carbamoyl-4-phenyl-2(5H)-furanone

A solution of 50 grams (0.25 mole) of 3-carbamoyl-4-phenyl-2(5H)-furanone, 26 grams (0.25 mole) of benzaldehyde, 0.5 ml. of piperidine, 0.5 ml. of glacial acetic acid, and 250 ml. of toluene was stirred at reflux with azeotropic removal of water for 4 hours. The product which separated upon cooling to room temperature was collected and recrystallized twice from chlorobenzene to give 60 grams (82 percent) of pale yellow crystals, M.P. 198–200° C.

EXAMPLE XV 5-benzylidene-3-phenylureidocarbonyl-4-phenyl-2(5H)-furanone

A mixture of 29.1 grams (0.100 mole) of 5-benzylidene-3-carbamoyl-4-phenyl-2(5H)-furanone, 230 ml. of 1,2-dichloroethane and 12.7 grams (0.100 mole) of oxalyl chloride was refluxed for 6 hours, treated with 9.3 grams (0.100 mole) of aniline and allowed to cool overnight to room temperature. The solid was collected and recrystallized from 200 ml. of aniline to give 23.9 grams (58.3%) of yellow crystals, M.P. 242–245° C.

EXAMPLE XVI 3-cyano-5-o-nitrobenzylidene-4-phenyl-2(5H)-furanone

A solution of 37.0 grams (0.200 mole) of 3-cyano-4-phenyl-2(5H)-furanone, 30.2 grams (0.200 mole) of o-nitrobenzaldehyde, 250 ml. of toluene, 0.5 ml. of acetic acid and 0.5 ml. of piperidine was refluxed for 1 hour with azeotropic removal of 3 ml. of water. The solid which separated upon cooling to room temperature was collected and recrystallized from 150 ml. of toluene and then from 125 ml. of acetonitrile to give 33.1 grams (52.0%) of pale yellow crystals, M.P. 164–166° C., $\lambda_{max.}^{DMF} = 259$ nm, 351 nm; log E=4.04, 430

EXAMPLE XVII 5-benzylidene-3-(N-ethoxycarbonyl)carbamoyl-4-phenyl-2(5H)-furanone A mixture of 29.1 grams (0.100 mole) of 5-benzylidene-3-carbamoyl-4-phenyl-2(5H)-furanone, 230 ml. of 1,2-dichloroethane and 12.7 grams (0.100 mole) of oxalyl chloride was refluxed for 6 hours, treated with 4.7 grams (0.10 mole) of ethanol and allowed to cool overnight to room temperature. The solid which separated upon concentration to 100 ml. and cooling to room temperature was collected and recrystallized twice from 5 volumes of benzene to give 30.0 grams (82.6%), M.P. 161–162° C.

EXAMPLE XVIII 5-benzylidene-4-methyl-3-p-nitrophenyl-2(5H)-furanone

A mixture of 11.0 grams (0.0500 mole) of 4-methyl-3-p-nitrophenyl-2(5H)-furanone, 10.6 grams (0.100 mole) of benzaldehyde, 150 ml. of toluene, 0.5 ml. of acetic acid, and 0.5 ml. of piperidine was stirred at reflux for 1 hour with azeotropic removal of 0.9 ml. of water. The solid which separated upon cooling in an ice bath was collected and recrystallized from 100 ml. of chlorobenzene to give 12.3 grams (83.3%) of pale yellow crystals, M.P. 229–231° C., $\lambda_{max.}^{DMF} = 366$ nm.; log E 4.57

The compounds in the following table were prepared according to the method described in Examples XII and XIII above, except that the appropriate aromatic aldehydes and recrystallization solvents were substituted for benzaldehyde and chlorobenzene respectively.

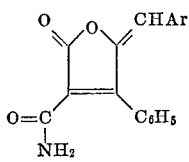

| Example number | Ar | M.P. (° C.) (recryst. solvent) | $\lambda_{max.}^{DMF}$ in nm. | Percent yield |
|---|---|---|---|---|
| XIX | CH₃—C₆H₄— | 217–219 (C₆H₅Cl) | 360 | 74.4 |
| XX | Cl—C₆H₄— | 228–229 (dioxane) | 348 | 86.0 |
| XXI | Cl₂—C₆H₃— | 225–228 (C₆H₅Cl) | 308 | 78.1 |
| XXII | methylenedioxyphenyl | 281–283 (DMF) | 397 | 85.5 |

The names of compounds XIX–XXII are as follows:

XIX—3-carbamoyl-5-(2-methylbenzylidene)-4-phenyl-2(5H)-furanone
XX—3-carbamoyl-5-(2-chlorobenzylidene)-4-phenyl-2(5H)-furanone
XXI—3-carbamoyl-5-(2,6-dichlorobenzylidene)-4-phenyl-2(5H)-furanone
XXII—3-carbamoyl-5-(3,4-methylenedioxybenzylidene)-4-phenyl-2(5H)-furanone

EXAMPLE XXIII 3-cyano-4-phenyl-5-(4-pyridylmethylidene)-2(5H)-furanone

A mixture of 55.4 grams (0.299 mole) of 3-cyano-4-phenyl-2(5H)-furanone, 32 grams (0.30 mole) of 4-pyridinecarboxaldehyde, 0.5 ml. of acetic acid and 0.5 ml. of piperidine in 300 ml. of toluene was heated under reflux for 2 hours until 5 ml. of water was collected in a moisture trap. The mixture was cooled for 14 hours in a refrigerator and the crude product was collected by filtration. This material was crystallized twice from pyridine to yield 16.8 grams of 3-cyano-4-phenyl-5-(4-pyridylmethylidene)-2(5H)-furanone melting at 216–218° C., $\lambda_{max.}^{DMF} = 348$ nm.

The compounds in the following table were prepared by the same procedure as Example XXIII above, except that the appropriate aldehydes and recrystallization solvents were substituted for 4-pyridinecarboxaldehyde and pyridine respectively.

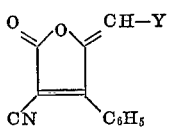

| Example number | Y | M.P. (° C.) (recryst. solvent) | $\lambda_{max.}^{DMF}$ (in nm.) |
|---|---|---|---|
| XXIV | 2-furyl | 201–202 (chlorobenzene) | 280 / 422 |
| XXV | (CH₃)₂CH— | 109–111 (ethyl alcohol) | 308 / 370 |
| XXVI | 2-thienyl | 210–211 (toluene-chlorobenzene, 6:1) | 417 |
| XXVII | 2-pyridyl | 192–194 (chlorobenzene) | 357 |

The names of compounds XXIV through XXVII are

XXIV—3-cyano-5-(2-furylmethylidene)-4-phenyl-2(5H)-furanone
XXV—3-cyano-5-isobutylidene-4-phenyl-2(5H)-furanone
XXVI—3-cyano-4-phenyl-5-(2-thienylmethylidene)-2(5H)-furanone
XXVII—3-cyano-4-phenyl-5-(2-pyridylmethylidene)-2(5H)-furanone Treatment of 3-carbamoyl-4-phenyl-2(5H)-furanone with sulfuric acid and sodium nitrite gave 3-carboxy-4-phenyl-2(5H)-furanone. Conversion of this compound to the acid chloride followed by treatment with appropriate amines gave N-substituted 3-carbamoyl-2(5H)-furanones which could also be reacted with benzaldehyde to give the corresponding 5-benzylidene derivatives. These procedures are described in the examples which follow.

EXAMPLE XXVIII 3-carboxy-4-phenyl-2(5H)-furanone

To a solution of 228 ml. of concentrated sulfuric acid and 180 ml. of water at room temperature was added 20 grams (0.10 mole) of 3-carbamoyl-4-phenyl-2(5H)-furanone. The resulting solution was treated with stirring and cooling at 25° C. with 7.5 grams (0.11 mole) of sodium nitrite in small portions during ½ hour. The solution effervesced and a colorless solid gradually separated. The mixture was stirred for 3 hours after completion of the addition and then poured onto 500 grams of crushed ice. The solid was collected, washed with water, and air dried at room temperature to give 20 grams (100 percent) of cream colored product, M.P. 166–171° C.

EXAMPLE XXIX 3-chlorocarbonyl-4-phenyl-2(5H)-furanone

To a suspension of 21.3 grams (0.104 mole) of 3-carboxy-4-phenyl-2(5H)-furanone in 150 ml. of benzene containing 1 ml. of dimethylformamide was added dropwise with stirring 14.0 grams (0.11 mole) of oxalyl chloride. The mixture was stirred for ½ hour after completion of the addition. The resulting solution was diluted with an equal volume of ligroine (B.P. 66–75° C.) and chilled for several hours. The solid was collected, washed with ligroine (B.P. 66–75° C.) and dried at room temperature to give 14.2 grams (64.2 percent) of product, M.P. 123–127° C.

EXAMPLE XXX

3-N-phenylcarbamoyl-4-phenyl-2(5H)-furanone

To a solution of 14.2 grams (0.0668 mole) of 3-chlorocarbonyl-4-phenyl-2(5H)-furanone in 150 ml. of benzene was added dropwise with stirring at 10–15° C. 12.5 grams (0.134 mole) of aniline in 20 ml. of benzene. A solid separated immediately. The mixture was stirred for ½ hour after completion of the addition. The solid was collected, washed with water and air dried to give 13.6 grams of product, M.P. 155–162° C. Recrystallization from 75 ml. of acetonitrile gave 9.0 grams (48 percent) of colorless crystals, M.P. 166–168° C.

Similar treatment of 3-chlorocarbonyl-4-phenyl-2(5H)-furanone with piperidine gave 4-phenyl-3-piperidinocarbonyl-2(5H)-furanone, M.P. 150–153° C., in 74.8 percent yield.

EXAMPLE XXXI 5-benzylidene-3-N-phenylcarbamoyl-4-phenyl-2(5H)-furanone

A solution of 7.5 grams (0.027 mole) of 3-N-phenylcarbamoyl-4-phenyl-2(5H)-furanone, 2.9 grams (0.027 mole) of benzaldehyde, 0.5 ml. of piperidine, 0.5 ml. of glacial acetic acid, and 50 ml. of toluene was refluxed with stirring and azeotropic removal of water for 3½ hours. Cooling the mixture in an ice bath, collection of the solid, and recrystallization from 50 ml. of dioxane gave 6.4 grams (64 percent) of yellow crystals, M.P. 214–216° C., $$\lambda_{max.}^{DMF} = 357 \text{ nm.}$$

Similar treatment of 4-phenyl-3-piperidinocarbonyl-(5H)-furanone with benzaldehyde gave a 50 percent yield of 5-benzylidene-4-phenyl-3-piperidinocarbonyl-2(5H)-furanone as colorless crystals, M.P. 164–165° C.

$$\lambda_{max.}^{DMF} = 347 \text{ nm.}$$

EXAMPLE XXXII 3-methoxycarbonyl-4-phenyl-2(5H)-furanone

A mixture of 81.2 grams (0.398 mole) of 3-carboxy-4-phenyl-2(5H)-furanone and 500 ml. of methanol was saturated with hydrogen chloride, refluxed for 1 hour, and allowed to cool overnight to room temperature. The solid was collected, washed with methanol, and dried to give 55.0 grams of product, M.P. 125–139° C. Recrystallization from 500 ml. of methanol gave 45.2 grams (52.0 percent) of colorless crystals, M.P. 138–141° C.

EXAMPLE XXXIII 5-benzylidene-3-methoxycarbonyl-4-phenyl-2(5H)-furanone

A solution of 9.5 grams (0.044 mole) of 3-methoxycarbonyl-4-phenyl-2(5H)-furanone, 4.6 grams (0.044 mole) of benzaldehyde, 0.5 ml. of piperidine, and 0.5 ml. of glacial acetic acid was refluxed with stirring and azeotropic removal of water for 1 hour and allowed to cool overnight to room temperature. The solid was collected and recrystallized from acetonitrile to give 6.2 grams (46 percent) of pale yellow crystals, M.P. 158–161° C., $$\lambda_{max.}^{CHCl_3} = 367 \text{ nm.}$$

The ultraviolet absorbing compounds of our invention are useful, for example, in connection with linear polyester materials such as polyethylene terephthalate. These linear polyester materials are linear polyesters of at least one glycol having 2 to 10 carbon atoms and at least one dibasic acid comprising at least 50 mole percent of an acid having two carboxyl radicals attached to a carbocyclic nucleus having from 4 to 6 carbon atoms per ring, said ester having a number average molecular weight of 10,000 to about 100,000, an inherent viscosity in a mixture of 60% phenol and 40% tetrachloroethane of at least 0.3 and melting at from about 175° to about 350° C.

The use of the ultraviolet absorbing compounds of the invention in a radiographic image-recording element in which the support can be a linear condensation polymer such as polyethylene terephthalate is described and claimed in U.S. application Ser. No. 868,222, now abandoned filed Oct. 21, 1969. The descriptive portion of this application is herewith incorporated by reference in the present application.

As stated in application Ser. No. 868,222, now abandoned "In a preferred embodiment the support comprises a linear condensation polymer of high molecular weight. One suitable polymer of this type is polyethylene terephthalate which can be melt extruded to form bases of varying thicknesses as desired, e.g., in the range of about 1 to about 10 mils. Polymers of this type are often melt extruded at temperatures in the range of about 270° C., to about 305° C."

Due to their stability upon melt extrusion at such temperatures, the furanone ultraviolet absorbing compounds of the present invention are advantageously incorporated into such a film support. Additionally, the furanone ultraviolet absorbing compounds are compatible with and non-subliming in polyethylene terephthalate base.

When incorporated in the base, the above-described class of ultraviolet absorbing materials are suitably added to the linear polyester resin powder in a range from about 50 to about 2,000 parts per million prior to extrusion, drafting and tentering.

As described hereinafter the compounds of our invention are useful for the heat stabilization of the linear polyester defined hereinbefore.

It is well known that linear polyesters such as poly-(ethylene terephthalate) thermally degrade spontaneously when such materials are heated for any extended period of time at temperatures substantially above their melting points. Such spontaneous degradation reveals itself in the manner in which it affects some of the important physical and chemical properties of the polyester material. For example, exposure of the polyester to temperatures at which it would ordinarily be extruded and/or molded or cast into some useful form [such as about 275° C. for poly(ethylene terephthalate)] for only a few minutes results in (a) the intrinsic viscosity of polyester dropping fairly sharply, (b) more unwanted carboxylic acid and aldehydic "ends" appearing in the polymer and (c) an undesirable brownish discoloration developing fairly rapidly in the molten material. All of these evidences of degradation are almost invariably undesirable. In fact, for some intended end uses of polyesters, the amount of loss of viscosity (and the concurrent loss of other related physical properties) that occurs over a period of time of as little as 20 minutes sometimes makes it necessary to discard the thermally degraded material.

The undesired spontaneous high temperature thermal degradation of linear polyesters (having repeating residue units of at least one glycol and at least one dicarboxylic acid) can be prevented by the incorporation into the polyester material of a small, but effective, stabilizing amount of one or more 2(5H)-furanone materials (a) which are compatible with the polyester being stabilized (b) which are stable themselves at temperatures of at least about 275° C., and (c) which have the structure

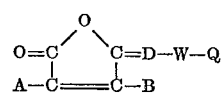

wherein A is

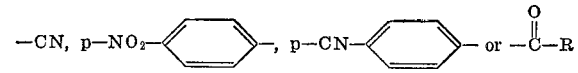

R being an amino, substituted amino, alkoxy, aralkoxy, alkyl, aryl, or heterocyclic substituent, B is an alkyl, aryl, aralkyl, alkaryl or H substituent, D is a methylidene radical (=CH—3, a polymethine chain of 2–5 carbon atoms, a p-phenylene methylidene radical, a nitrogen atom (=N—), a hydrazinylidene radical, an alkylidyne radical or an aralkylidene radical, W is either a carbon-carbon single bond or a methylidene radical; and Q is an alkyl, aryl, a heterocyclic ring or a heterocyclidene radical.

The compatibility and the stability of these 2(5H) furanones can readily be determined by melting them, for example, at a level of about 1000 p.p.m. together with poly(ethylene terephthalate), and holding the resulting molten mixture at a temperature of about 280° C. for 30 minutes. If the resulting mixture remains uniform in clarity, and does not develop a high degree of brownish or dark yellow color in this period of time, the furanone is both "compatible" and "stable," in accordance with the aforementioned limitations regarding those 2(5H) furanones that can be used successfully.

Of the 2(5H)-furanones that are useful for the heat stabilization of said linear polyester materials several are particularly preferred. These are:

(a) 3-cyano-5-orthonitrobenzylidene-4-phenyl-2(5H) furanone
(b) 5-benzylidene-4-methyl-3-p-nitrophenyl-2(5H) furanone
(c) 5-benzylidene-3-carbamoyl-4-phenyl-2(5H) furanone
(d) 3-cyano-4-phenyl-5-(4-pyridylmethylidene)-2(5H) furanone
(e) 3-carbamoyl-5-(2-methylbenzylidene)-4-phenyl-2(5H) furanone
(f) 5-benzylidene-3-N-(ethoxycarbonyl)carbamoyl-4-phenyl-2(5H)furanone
(g) 5-benzylidene-3-phenylureido-4-phenyl-2(5H) furanone
(h) 5-benzylidene-3-cyano-4-phenyl-2(5H) furanone
(i) 3-cyano-5-dimethylaminomethylidene-4-phenyl-2(5H) furanone Of these, compounds (g), (h), (i), (b) and (d) are still further preferred. Still further preferred for use in the practice of this invention are those 2(5H)-furanones which are essentially colorless; that is, which impart very little, if any, color to the polyester material when the furanone is present at the 1000 p.p.m. level. In this regard, particularly preferred polyester compositions contain (1) poly(ethylene terephthalate), poly(1,4 - cyclohexylenedimethylene terephthalate), poly(ethylene isophthalate), poly(ethylene naphthalenedicarboxylate) or a mixture of at least two of these, as the polyester component and (2) an effective stabilizing amount of one of (or a mxiture of) the compatible, stable (5H)-furanones described above, which compositions absorb ultraviolet light in the region of 380 nm., and which compositions yield solution "color" values of at most about 12, when measured in the following manner:

A 10% by weight solution of the composition (in 60:40 phenol:chlorobenzene) is measured for percent transmission at 400 and 550 nanometer with a conventional spectrophotometer, with the solvent serving as a blank. Color value is calculated as follows:

Color value=100—½ (T₄₀₀+T₅₅₀)

Only a very small amount of the 2(5H)-furanone compound(s) need be present in the molten polyester in order for at least a small amount of benefit to be obtained. However, generally for most uses a relatively high degree of thermal stabilization of the polyester is desired. Therefore, generally at least about 50 parts per million (based on the amount of polyester present) of the valuable 2(5H)-furanone material should be present in the resulting stabilized composition. While there is apparently no critical upper limit with regard to the amount of furanone that can be used to effectively stabilize the polyester compositions, generally, because of cost considerations and because sometimes the color contributed by certain of the furanones to the resulting composition is not desired, at most about 5,000 parts per million of the furanone material should be used. For optimum results, it is preferred that the total amount of furanone materials present in the polyester compositions be within the range of from about 100 to about 2,000 parts per million.

All parts referred to are by weight unless otherwise specified.

Apparently the particular manner whereby the furanone material is incorporated into the polyester material is also not critical. The furanone can, for example, be simply physically mixed with powdered or pelletized or flaked polyester prior to the time the materials are melted together in the extruder. If desired, an intimate blend of the polyester and furanone can be prepared prior to the extrusion step by either melting the components together in a separate step or even by dissolving them together in a common solvent system and subsequently removing the solvent. In any event, apparently all that is needed to effectively stabilize the polyesters with one or more of the 2(5H) furanones is to uniformly disperse (or dissolve) the furanones material through the polyester.

The heat-stabilized polyester compositions referred to hereinbefore are described and claimed in U.S. application Ser. No. 838,473, filed July 2, 1969. The descriptive portion of this application is herewith incorporated by reference in the present application.

We claim:

1. A compound having the formula:

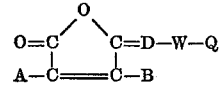

wherein A is —CN, p-nitrophenyl or

wherein R is amino, a low carbon alkyl group, alkoxycarbonylamido in which the alkoxy portion has up to and including 8 carbon atoms, anilino or phenylureido, B is phenyl, p-nitrophenyl or 4-hydroxy-3-methoxyphenyl, D is methylidene,

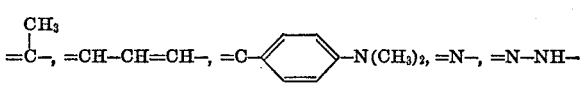

phenylenemethylidene or di(alkyl)aminophenylmethylidene in which each alkyl group contains 1 to 4 carbon atoms, W is a carbon-carbon single bond or methylidene and Q is a heterocyclic radical selected from the group consisting of furyl, thienyl, 4-pyridiyl

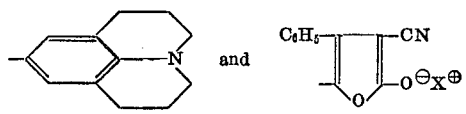

wherein X⊕ is the cation (C₂H₅)₃NH⊕ or C₅H₅NH⊕, a heterocyclylidene radical selected from the group consisting of

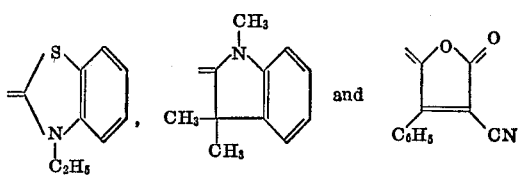

di(alkyl)amino in which each alkyl group contains 1 to 4 carbon atoms, phenyl, p-nitrophenyl, p-dimethylaminophenyl or p-N-ethyl-N-(2-hydroxyethyl)aminophenyl.

2. A compound in accordance with claim 1 wherein Q is phenyl, p-nitrophenyl or p-dimethylaminophenyl.

3. An ultraviolet absorbing compound having the formula:

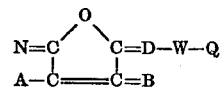

wherein A is —CN, p-nitrophenyl or

wherein R is amino, a low carbon alkyl group, anilino or phenylureido, B is phenyl or p-nitrophenyl, D is methylidene,

phenylenemethylidene or di(alkyl)aminophenylmethylidene in which each alkyl group contains 1 to 4 carbon atoms, W is a carbon-carbon single bond or methylidene and Q is di(alkyl)amino in which each alkyl group contains 1 to 4 carbon atoms, phenyl, p-nitrophenyl or p-dimethylaminophenyl.

4. A compound in accordance with claim 3 wherein Q is di(alkyl)amino in which each alkyl group contains 1 to 4 carbon atoms.

5. A compound in accordance with claim 1 wherein said compound is selected from the group consisting of:
3-cyano-5-orthonitrobenzylidene-4-phenyl-2(5H)-furanone
5-benzylidene-4-methyl-3-p-nitrophenyl-2(5H)-furanone
5-benzylidene-3-carbamoyl-4-phenyl-2(5H)-furanone
3-cyano-4-phenyl-5-(4-pyridylmethylidene)-2-(5H)-furanone
3-carbamoyl-5-(2-methylbenzylidene)-4-phenyl-2(5H)-furanone
5-benzylidene-3-N-(ethoxycarbonyl)carbamoyl-4-phenyl-2(5H)-furanone
5-benzylidene-3-phenylureido-4-phenyl-2(5H)-furanone
5-benzylidene-3-cyano-4-phenyl-2(5H)-furanone
3-cyano-5-dimethylaminomethylidene-4-phenyl-2(5H)-furanone.

6. A compound in accordance with claim 1 wherein said compound is 5-benzylidene-3-carbamoyl-4-phenyl-2(5H)-furanone.

7. A compound in accordance with claim 1 wherein said compound is 3 - cyano- 5 - p - dimethylaminophenylimino-4-phenyl-2(5H)-furanone.

8. A compound in accordance with claim 1 wherein said compound is 3 - cyano-4-phenyl-5-[bis(p - dimethylaminophenyl)methylidene]-2-(5H)-furanone.

9. A compound in accordance with claim 1 wherein said compound is 5-[3-cyano-2-hydroxy-4-phenyl-5-furylmethylidene]-3-cyano-4-phenyl-2(5H)-furanone, pyridine salt.

10. A compound in accordance with claim 1 wherein said compound is 3-cyano-5-[2-(3-ethyl-2-benzothiazolylidene)ethylidene]-4-phenyl-2(5H)-furanone.

11. A compound in accordance with claim 1 wherein said compound is 3-cyano-4-phenyl-5-[2-(1,1,3 - trimethylindolinene-2-ylidene)ethylidene]-2(5H)-furanone.

12. A compound in accordance with claim 1 wherein said compound is 4-cyano-3-phenyl - 2,5 - dihydrofuran-2,5- dione - 2 - p - N - ethyl-N-(2-hydroxyethyl)aminophenylhydrazone.

References Cited
UNITED STATES PATENTS 3,507,648    4/1970   Ford et al. _____ 260—343.6 X

OTHER REFERENCES

Rao: Chemical Reviews, vol. 64, pp. 361, 367–8 and 373 (1964).

Alguero et al.: Tetrahedron, vol. 18, pp. 1381 to 1390 and 1393 (1962).

Castaner et al.: J. Chem. Soc., 1958, pp. 3962 to 3964 (1958).

Ford et al.: J. Org. Chem., vol. 32, pp. 173 to 177 (1967).

JOHN D. RANDOLPH, Primary Examiner

U.S. Cl. X.R.

8—177, 179; 96—1.6; 260—45.8, 240 R, 240 E, 240 G, 293.52, 295 R, 295 H, 296 R, 305, 326.11, 329 AM, 332.2 R, 347.4, 347.5, 347.7.